No. 873,844.
PATENTED DEC. 17, 1907.
E. COVERT.
POULTRY PICKING DEVICE.
APPLICATION FILED NOV. 21, 1906.
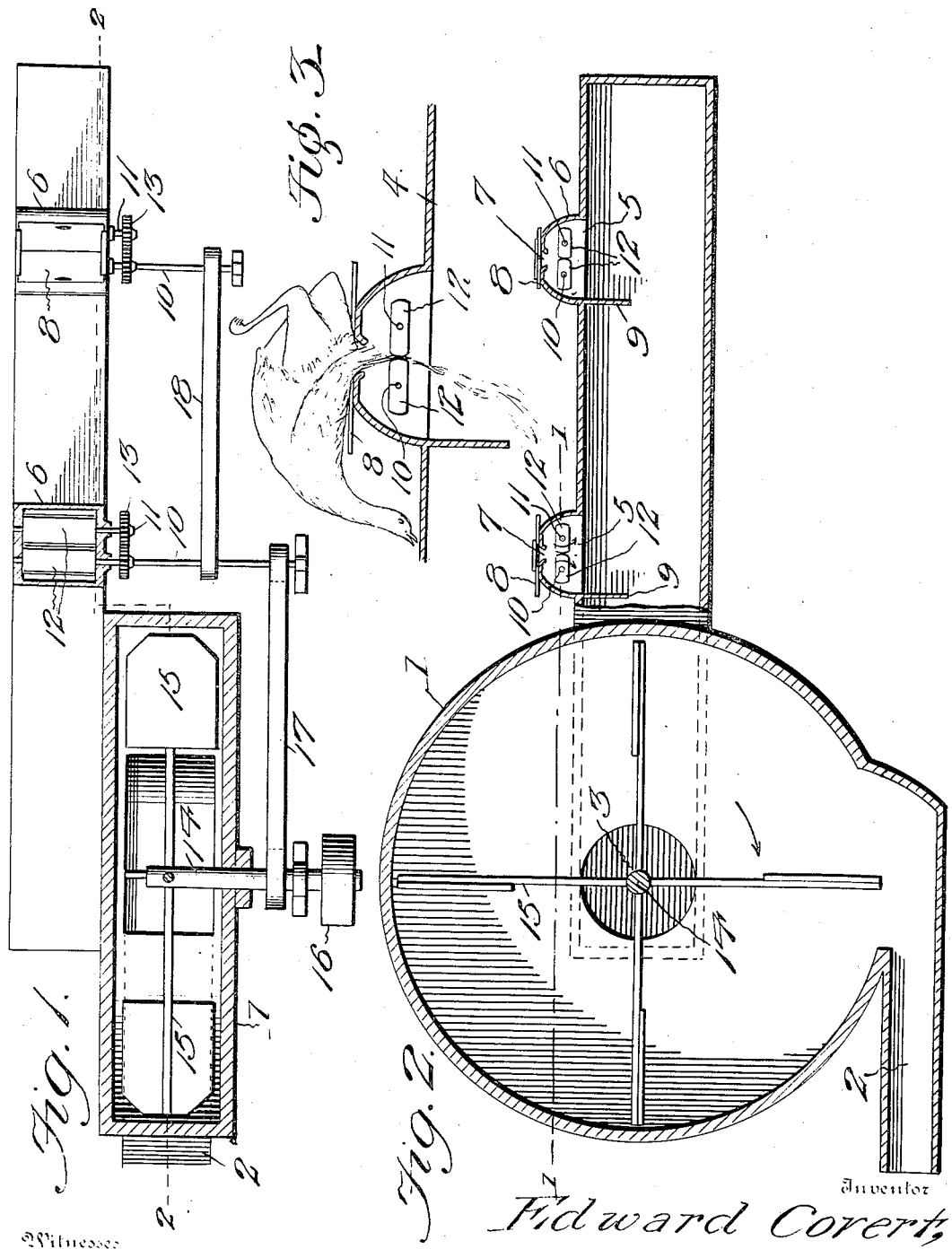

UNITED STATES PATENT OFFICE.

EDWARD COVERT, OF LA PRAIRIE, ILLINOIS.

POULTRY-PICKING DEVICE.

No. 873,844.  Specification of Letters Patent.  Patented Dec. 17, 1907.

Application filed November 21, 1906. Serial No. 344,468.

*To all whom it may concern:*

Be it known that I, EDWARD COVERT, a citizen of the United States, residing at La Prairie, in the county of Adams and State of Illinois, have invented new and useful Improvements in Poultry-Picking Devices, of which the following is a specification.

This invention relates to poultry picking devices and embodies in its organization a casing containing a rotary fan and having a discharge port, together with a feather receiving duct communicating with the casing and having inlet mouths in which are journaled pairs of cooperating plucking members.

The invention has for its objects to provide a comparatively simple, inexpensive device of this character which will readily and effectually remove the feathers from the poultry, one wherein the feathers will be drawn from the duct into the casing and finally discharged from the latter, and one in which the picking members will be positively operated through connections with the fan shaft.

With these and other objects in view, the invention comprises the novel features of construction and combination of parts more fully hereinafter described.

In the accompanying drawings: Figure 1 is a top plan view, partly in horizontal section, of a device embodying the invention, the section being taken on the line 1—1 of Fig. 2. Fig. 2 is a vertical, longitudinal section taken on the line 2—2 of Fig. 1. Fig. 3 is an enlarged detail view of one of the plucking means showing the same in operation.

Referring to the drawings, 1 designates a casing of the form shown having a discharge port 2 leading therefrom, the casing being connected at one side by a central opening 3 for communication with the forward end of a feather reciving duct 4 in turn provided in its upper wall with a pair of inlet openings or ports 5 covered by arched hoods 6 having inlet mouths 7 which may be closed through the medium of slide valves 8, while depending into the duct at the forward edges of the openings 5 are vertical baffle plates 9, for a purpose which will hereinafter appear.

Journaled in each of the hoods 6 and immediately beneath the adjacent mouth 7 is a pair of shafts 10, 11, on which are fixed cooperating rotary picking members or blades 12 and a pair of intermeshing toothed gears 13, connecting the shafts for rotation one from the other and in relatively reverse directions.

Journaled centrally in the casing 1 is a transversely extending, rotary drive shaft 14 carrying a fan 15 and having fixed on its outer end a pulley 16 adapted to receive a belt running from any suitable source of power. The fan shaft 14 is connected with the forward picker shaft 10 by means of a belt 17 arranged to travel on suitable pulleys, while the pair of picker shafts 10 are in like manner connected for operation one from the other by means of a belt 18.

In practice, the shaft 14 is driven from any suitable source of power for rotating the fan 15 in the direction indicated by the arrow in Fig. 2, thus creating in the duct 14 a strong, forwardly traveling current of air. As the shaft 14 rotates the shafts 10 will be operated through the medium of the connecting belts 17 and 18 for operating the picker blades 12, as indicated by the arrows in Fig. 2. The parts being in operation, as explained, the fowl to be plucked is placed over one of the mouths 7 between the slide valves 8, which, of course, have been previously opened, and the current of air passing into the opening 7 draws the feathers inward for engagement by the cooperating blades 12, it being noted that through the provision of the baffles 9 the air passing in the openings 7 will travel vertically downward to thus properly draw the feathers between the picker members. The plucked feathers fall into the duct 4 and are drawn therefrom through the opening 3 into the casing and finally discharged from the latter through the port 2.

Having thus described my invention, what I claim is:

1. In a poultry picking device, the combination of a duct having an inlet in its side at a point intermediate its ends, a hood covering said opening and provided with a mouth, a deflector in the duct adjacent the hood and arranged to direct the incoming currents of air, a fan casing connected with the duct, a shaft mounted in the casing, a fan thereon rotated to produce a suction laterally into the duct through the said mouth, a pair of rotary picking blades arranged in the hood adjacent the mouth thereof, means connected with the blades for rotating them in opposite directions simultaneously, and a driving connection between the fan shaft and the said means.

2. In a poultry plucking device, a duct having a pair of inlet openings, hoods covering said openings and provided with inlet mouths, closures for said mouths, a fan casing connected with the forward end of the duct, a fan shaft journaled in said casing and carrying a suction fan, two pairs of picking blades arranged respectively in said hoods, the blades of each pair being connected for reverse rotation, means connecting the two pairs of blades for operation one from another, and operative connections between the fan shaft and one of the pairs of blades.

3. In a poultry plucking device, a fan casing, a duct communicating with and leading from said casing, a fan shaft arranged in the latter and carrying a suction fan, said duct being provided with an inlet opening, a hood covering said opening and provided with an inlet mouth, slides arranged to close said mouth, a pair of picker shafts journaled in the hood and carrying coöperating picking blades, means connecting the shafts for reverse rotation, and a pulley and belt connection between one of the picker shafts and the fan shaft.

In testimony whereof, I affix my signature in presence of two witnesses.

EDWARD COVERT.

Witnesses:
JOHN W. COVERT,
T. W. NOAKES.